(12) United States Patent
Wu et al.

(10) Patent No.: US 11,741,831 B2
(45) Date of Patent: Aug. 29, 2023

(54) INTERSECTION WARNING SYSTEM BASED ON INFORMATION FUSION AND METHOD THEREOF

(71) Applicant: AUTOMOTIVE RESEARCH & TESTING CENTER, Changhua Hsien (TW)

(72) Inventors: Yu-Cheng Wu, Changhua Hsien (TW); You-Sian Lin, Changhua Hsien (TW); Chih-Neng Liang, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 150 days.

(21) Appl. No.: 17/537,666

(22) Filed: Nov. 30, 2021

(65) Prior Publication Data
US 2023/0169855 A1 Jun. 1, 2023

(51) Int. Cl.
*G08G 1/07* (2006.01)
(52) U.S. Cl.
CPC ..................................... *G08G 1/07* (2013.01)
(58) Field of Classification Search
CPC ............ G08G 1/07; G08G 1/164; G08G 1/08; G08G 1/083
See application file for complete search history.

(56) References Cited

U.S. PATENT DOCUMENTS

| | | | | |
|---|---|---|---|---|
| 11,107,346 B2* | 8/2021 | Camras | ................ | H05B 47/115 |
| 11,508,235 B2* | 11/2022 | Camras | ................ | G08G 1/162 |
| 11,593,539 B2* | 2/2023 | Russo | ................ | G06Q 50/30 |
| 2016/0155334 A1* | 6/2016 | Jansson | ................ | G08G 1/07 |
| | | | | 340/906 |
| 2019/0197883 A1* | 6/2019 | Camras | ................ | H05B 47/125 |
| 2021/0197846 A1* | 7/2021 | Thakur | ................ | G01S 17/931 |
| 2021/0383683 A1* | 12/2021 | Camras | ................ | H05B 47/125 |
| 2022/0327183 A1* | 10/2022 | Russo | ................ | G06Q 50/30 |

\* cited by examiner

*Primary Examiner* — Sisay Yacob
(74) *Attorney, Agent, or Firm* — Rabin & Berdo, P.C.

(57) ABSTRACT

An intersection warning system based on information fusion and a method thereof, the system includes an intersection sensing device, an intersection computing device, a user device and a cloud server. The cloud server receives and stores on-site sensing information output from the intersection computing device and determines whether user positioning coordinates are received from the user device, if so, the cloud server reads the on-site sensing information and at least one background information, and calculates a fusion risk assessment value based on the on-site sensing information, the at least one background information, and multiple weightings; when the cloud server determines the fusion risk assessment value is greater than a threshold value, a warning command is output to the user device which sends out warning messages according to the warning command.

12 Claims, 6 Drawing Sheets

INTERSECTION WARNING SYSTEM BASED ON INFORMATION FUSION AND METHOD THEREOF

BACKGROUND OF THE INVENTION

1. Field of the Invention

The present invention relates to an intersection warning system, and in particular to an intersection warning system based on information fusion and a method thereof.

2. Description of the Related Art

In order to improve traffic safety and reduce accident rates, there are conventional reflectors, yellow flashing lights, red flashing lights and markings deployed at traditional road intersections. Among those, a road user is able to know whether there is a car on a curve in front according to reflected images from the reflectors; and a flashing yellow light is used to remind a road user to slow down while passing an intersection; and a flashing red light is used to remind a road user to stop before passing an intersection, and markings are used to enhance attention of a road user. Therefore, through the deployment of reflectors, yellow flashing lights, red flashing lights and markings, it is hoped that road users can be more aware of the road conditions when passing through intersections.

However, conventional reflectors, yellow flashing lights, red flashing lights, and markings are statically set up at intersections and need to be seen and recognized by road users to fulfill their functions. In cases of poor visibility on cloudy and rainy days or obscured by signage or road trees, their reminding functions to road users are greatly reduced, and accordingly, their effectiveness in protecting road users is much diminished.

SUMMARY OF THE INVENTION

In view of the above-mentioned, a main purpose of the present invention is to provide an intersection warning system based on information fusion and a method thereof, to overcome the ineffective protection over road users by the conventional reflectors, yellow flashing lights, red flashing lights and markings.

The present invention of an intersection warning system based on information fusion includes:
- an intersection sensing device, set up at an intersection;
- an intersection computing device, set up at the intersection and signally connected with the intersection sensing device, and outputting an on-site sensing information;
- a user device, providing a user positioning coordinates and storing coordinate information of an intersection advisory area corresponding to the intersection; and
- a cloud server, signally connected to the intersection computing device and the user device, and storing at least one background information corresponding to the intersection;
- when the user device determines the user positioning coordinates entering the intersection advisory area, the user positioning coordinates are sent to the cloud server; when the cloud server receives the user positioning coordinates, the cloud server reads the on-site sensing information and the at least one background information and calculates a fusion risk assessment value based on the on-site sensing information, the at least one background information and multiple weightings; when the cloud server determines the fusion risk assessment value is greater than a threshold value, a warning command is sent to the user device, and the user device sends out warning messages based on the warning command.

Moreover, the present invention of an intersection warning method based on information fusion, includes:
- receiving and storing on-site sensing information from an intersection computing device;
- determining whether user positioning coordinates from a user device are received;
- if the user positioning coordinates from the user device are received, reading on-site sensing information and at least one background information, and calculating a fusion risk assessment value based on the on-site sensing information and the at least one background information; and
- determining whether the fusion risk assessment value is greater than a threshold value;
- if the fusion risk assessment value is greater than the threshold value, outputting a warning command to the user device which sends out warning messages according to the warning command.

The present invention of an intersection warning system based on information fusion and a method thereof, collects the on-site sensing information and the at least one background information according to the location of the intersection where the road user is located. A fusion risk assessment value is generated through fusion calculations based on the collected information and the weightings. The fusion risk assessment value is used to assess the risk of accidents when the road user passes through the intersection. When the risk is high, the user device can send out warning messages to remind the road user to carefully pass the intersection. Compared with the conventional reflectors, yellow flashing lights, red flashing lights and markings, the user device of the present invention, as its name suggests, closely accompanies the road user, such that warning messages output from the user device is noticeable by the road user. Thereby, the alertness of the road user passing through the intersection is enhanced and the problems of limited effectiveness for the conventional reflectors, yellow flashing lights, red flashing lights and markings to remind road users, can be overcome.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

First of all, the actual road conditions include the road conditions of multiple intersections. The embodiments of the present invention only take single intersection for exemplar cases. Embodiments of multiple intersections can be deduced by analogy. Please refer to FIGS. 1-2: an embodiment of an intersection warning system based on information fusion of the present invention includes an intersection sensing device 10, an intersection computing device 20, a user device 30 and a cloud server 40.

Figure 2:
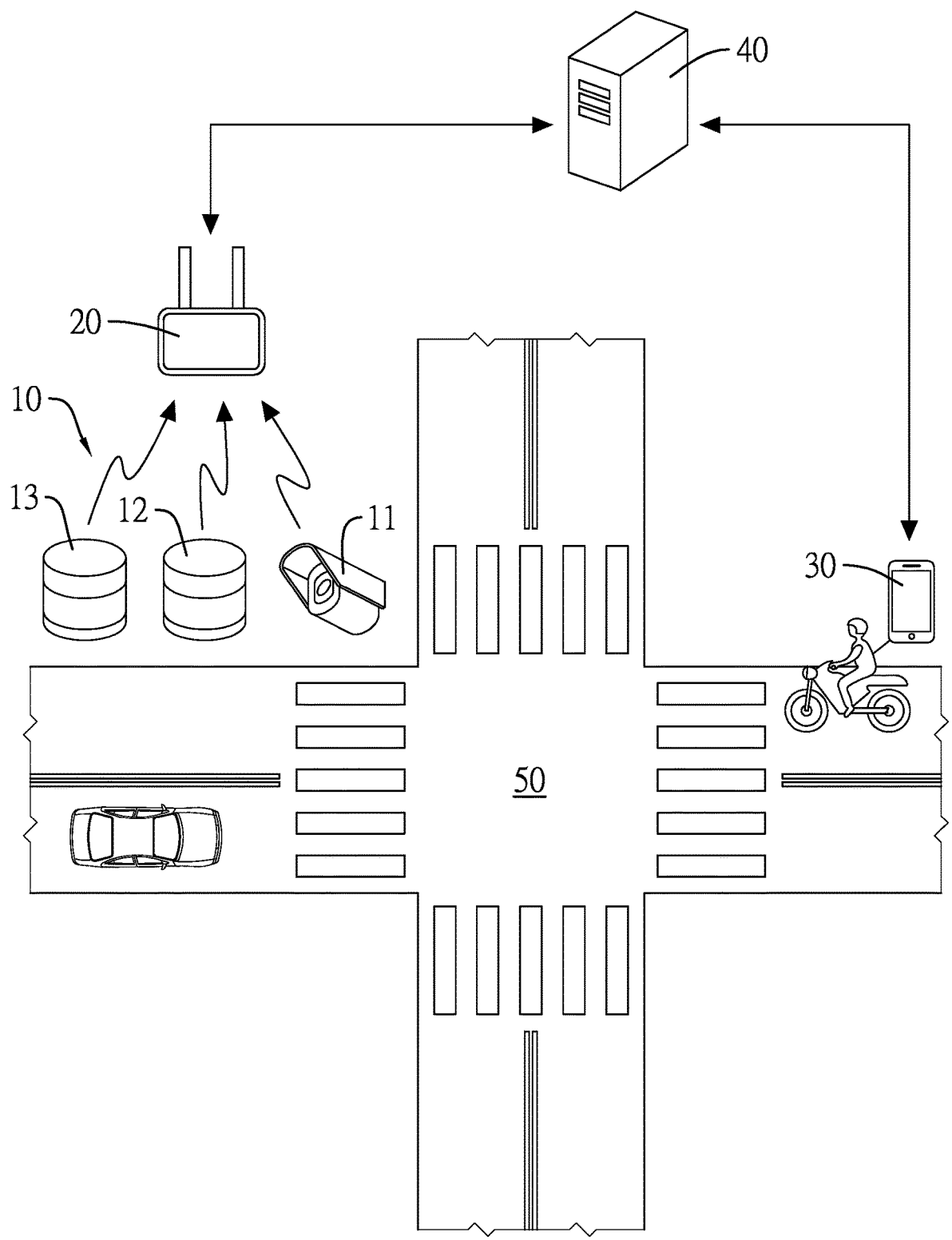
FIG. 2 is a system schematic of the intersection warning system based on information fusion of the present invention.

The intersection sensing device 10 is set up at an intersection 50 for outputting an on-site sensing information M, for example, the intersection 50 in FIG. 2 is a crossroad, and the intersection sensing device 10 is set up on an upright pole or a support frame at the intersection 50. The intersection sensing device 10 can be, but is not limited to, a camera 11, a Radar 12 (Radio Detection and Ranging) or a LiDAR 13 (Light Detection and Ranging). For example, in case that the intersection sensing device 10 is the camera 11, the camera 11 takes shots towards the intersection 50 with its field of view covering the intersection 50, and accordingly, the on-site sensing information M is the shots taken by the camera 11 which includes objects at the intersection 50, such as, pedestrians, bikes, vehicles, animals, etc. In case that the intersection sensing device 10 is the Radar 12 or the LiDAR 13, the Radar 12 or the LiDAR 13 scans towards the intersection 50, and accordingly, the on-site sensing information M is the scan information from the Radar 12 or the LiDAR 13 which includes wireless signals or optical signals reflected from the objects at the intersection 50.

The intersection computing device 20, which is also called a road side unit (RSU), is set up at a side of the intersection 50. Accordingly, the intersection computing device 20 and the intersection sensing device 10 are both set up at the same intersection 50, or on the same upright pole or support frame. The intersection computing device 20 basically includes processor integrated circuits (ICs), GPS chips, communication interfaces and antennas and accordingly the intersection computing device 20 has the functionalities of data processing, satellite positioning and data transmission. The intersection computing device 20 signally connects with the intersection sensing device 10 to receive and transmit the on-site sensing information M. A data packet of the on-site sensing information M transmitted by the intersection computing device 20 may include an identification code and positioning coordinates of the intersection computing device 20. Wherein, the intersection computing device 20 and the intersection sensing device 10 are signally connected through physical wiring circuits or wireless interconnection such as Wi-Fi, Bluetooth, etc.

Figure 3:
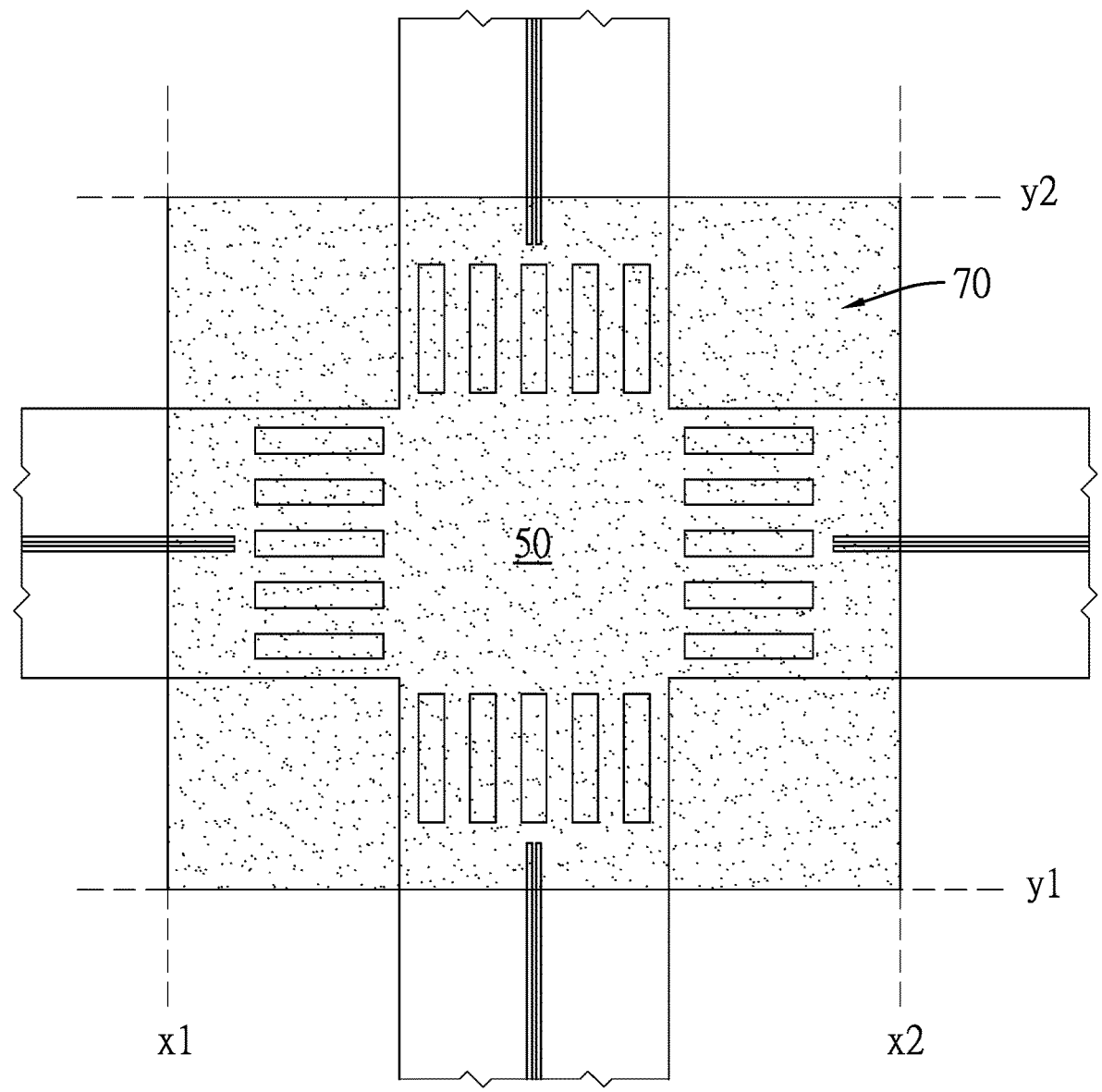
FIG. 3 is a schematic of setting the coordinates information of the intersection advisory area.

The user device 30 is a mobile electronic device of the user, for example, a smart phone or a tablet computer. In general, smart phones or tablet computers are equipped with network connection and satellite positioning functionalities. Wherein, the smart phone can be installed on the steering handles of the motorcycles through auxiliary brackets such that the user can view the display or hear the sound from the smart phone. Further, the user device 30 can be a vehicle electronic device installed on a vehicle, such as, a vehicle multimedia host with wireless network connectivity and satellite positioning functionalities. Since the user device 30 is equipped with satellite positioning functionality, it can provide user positioning coordinates P (e.g. GPS coordinates) and the user device 30 stores coordinates information of an intersection advisory area whose position corresponds to the intersection 50. For example, please refer to FIG. 3: the positioning coordinates of the intersection advisory area 70 can be defined within the area between longitude coordinates x1 and x2 and latitude coordinates y1 and y2. However, the intersection advisory area 70 is not limited to a rectangular area, and the shape of the intersection advisory area 70 can be adjusted according to the type of the intersection, traffic condition of the intersection and other requirements.

The cloud server 40 can be set up in a computer room. The cloud server 40 signally connects with the intersection computing device 20 and the user device 30. Wherein, the intersection computing device 20 can connect with the cloud server 40 through mobile communication technology, for example, 4G, 5G or more advanced mobile communication technologies. The intersection computing device 20 can also connect with the cloud server 40 through physical network cables of fixed-line telephony. The user device 30 can connect with the cloud server 40 through mobile communication technologies. Thereby, the cloud server 40, the intersection computing device 20 and the user device 30 are signally connected, and the cloud server 40 is able to receive and store the on-site sensing information M from the intersection computing device 20. The cloud server 40 is able to get the source of the on-site sensing information M according to the identification code and the positioning coordinates of the data packets of the on-site sensing information M.

As mentioned earlier, the actual road conditions include the road conditions of multiple intersections 50. Each of the multiple intersections 50 is set up with the intersection sensing device 10 and the intersection computing device 20, and correspondingly, the cloud server 40 can store the coordinate information of the multiple intersection advisory areas 70 and the identification codes and positioning coordinates of the multiple intersection computing devices 20 respectively corresponding to the multiple intersections 50. The positioning coordinates of each intersection computing device 20 and the coordinate information of each intersection advisory area 70 are in one-to-one correspondence. The embodiments of the present invention only takes single intersection 50 cases as examples, and therefore, the cloud server 40 can determine the on-site sensing information M corresponding to the intersection advisory area 70 according to the coordinate information of the intersection advisory area 70.

When the user device 30 connects to the cloud server 40, the user device 30 can download and store the coordinate information of the multiple intersection advisory areas 70 from the cloud server 40. Wherein, the administrative personnel of the cloud server 40 can obtain the coordinates of intersections of the actual roads through, for example, map information applications or websites, such as Google Map or Apple Map, so that the coordinate information of the multiple intersection advisory areas 70 can be entered, updated and maintained in the cloud server 40 to ensure the coordinate information of the multiple intersection advisory areas 70 downloaded by the user device 30 are most updated and most conforming to the positions of the intersections of the actual roads.

Figure 1:
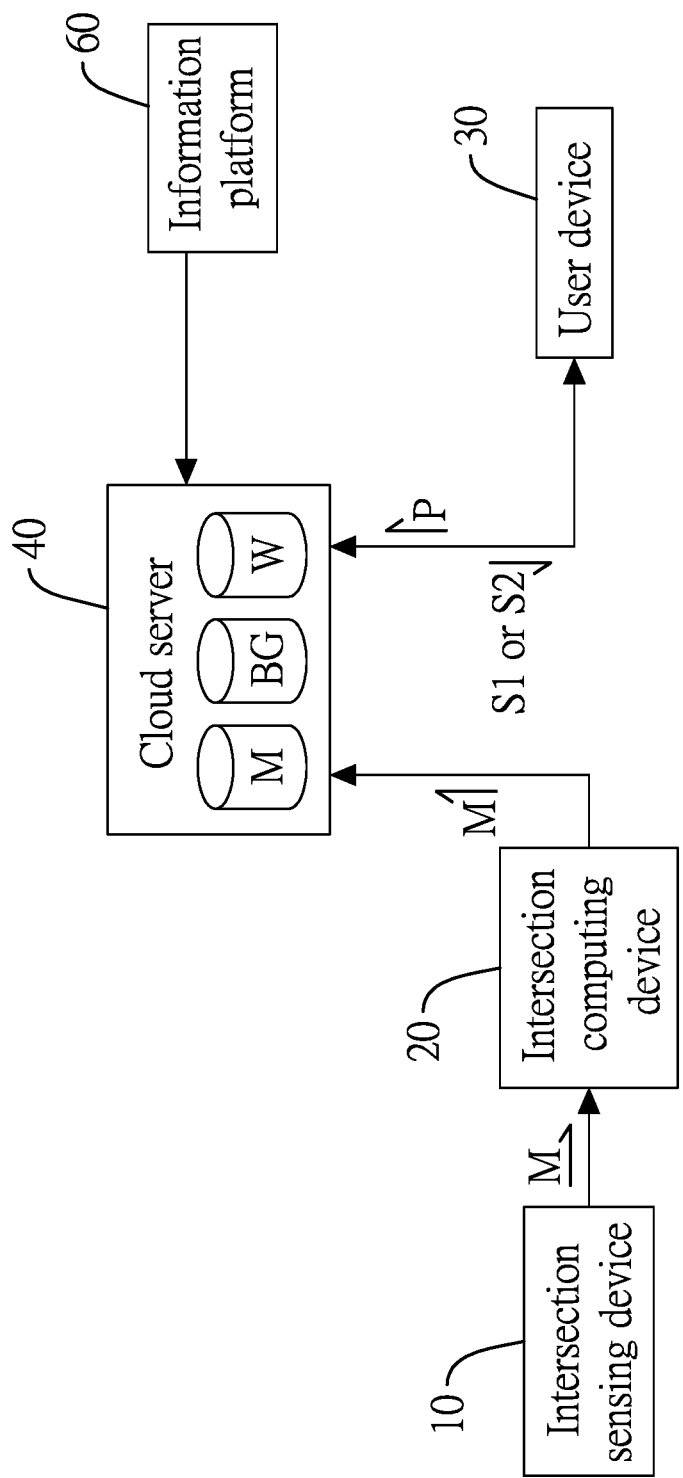
FIG. 1 is a block diagram of the intersection warning system based on information fusion of the present invention.

Please refer to FIG. 1. The cloud server 40 further stores the corresponding at least one background information BG and at least one evaluation parameter of the coordinate information of each intersection advisory area 70. Each background information BG and each evaluation parameter are in one-to-one correspondence. For example, the at least one background information BG can be at least one of a weather information, a traffic information during a period, a real-time traffic information, an intersection accident rate and a historical traffic flow. The data format of the at least one background information BG can be a code or a combination of the code and a time period, a batch of codes corresponding to a batch of evaluation parameters, wherein the value of the at least one evaluation parameter is an adjustable real number greater than or equal to zero and less than or equal to one. The larger the evaluation parameter means the intersection 50 is worse in safety whereas the lower the evaluation parameter means the intersection 50 is safer.

In one embodiment, the administrative personnel of the cloud server 40 can get relevant information through multi-facet information platform 60 (e.g. weather website and traffic information website). The cloud server 40 can enter, update and maintain at least one background information BG and at least one evaluation parameter or the cloud server 40 can download and update the at least one background information BG from the information platform 60. Hence, the cloud server 40 can determine the evaluation parameter corresponding to the at least one background information BG (i.e. a code). For example, in the following tables, when the background information BG read by the cloud server 40 is code "A2", it can be determined that the evaluation parameter is 0.5. The determinations of other evaluation parameters can be deduced by analogy.

| Code | Weather Information | Evaluation Parameters |
|---|---|---|
| A1 | Sunny Day | 0.1 |
| A2 | Cloudy Day | 0.5 |

| Code | Time Period | Traffic Information During a Period | Evaluation Parameters |
|---|---|---|---|
| B1 | Jun. 20, 2021 12:00-14:30 | Traffic Control | 0.3 |
| B2 | Jun. 20-25, 2021 12:00-14:30 | Road Work | 0.8 |

| Code | Real-Time Traffic Information | Evaluation Parameters |
|---|---|---|
| C1 | Smooth Traffic | 0.1 |
| C2 | Car Accidents | 0.4 |

| Code | Intersection Accident Rate | Evaluation Parameters |
|---|---|---|
| D1 | Low | 0.2 |
| D2 | High | 0.6 |

| Code | Historical Traffic Flow | Evaluation Parameters |
|---|---|---|
| E1 | Low | 0.2 |
| E2 | High | 0.6 |

Figure 4:
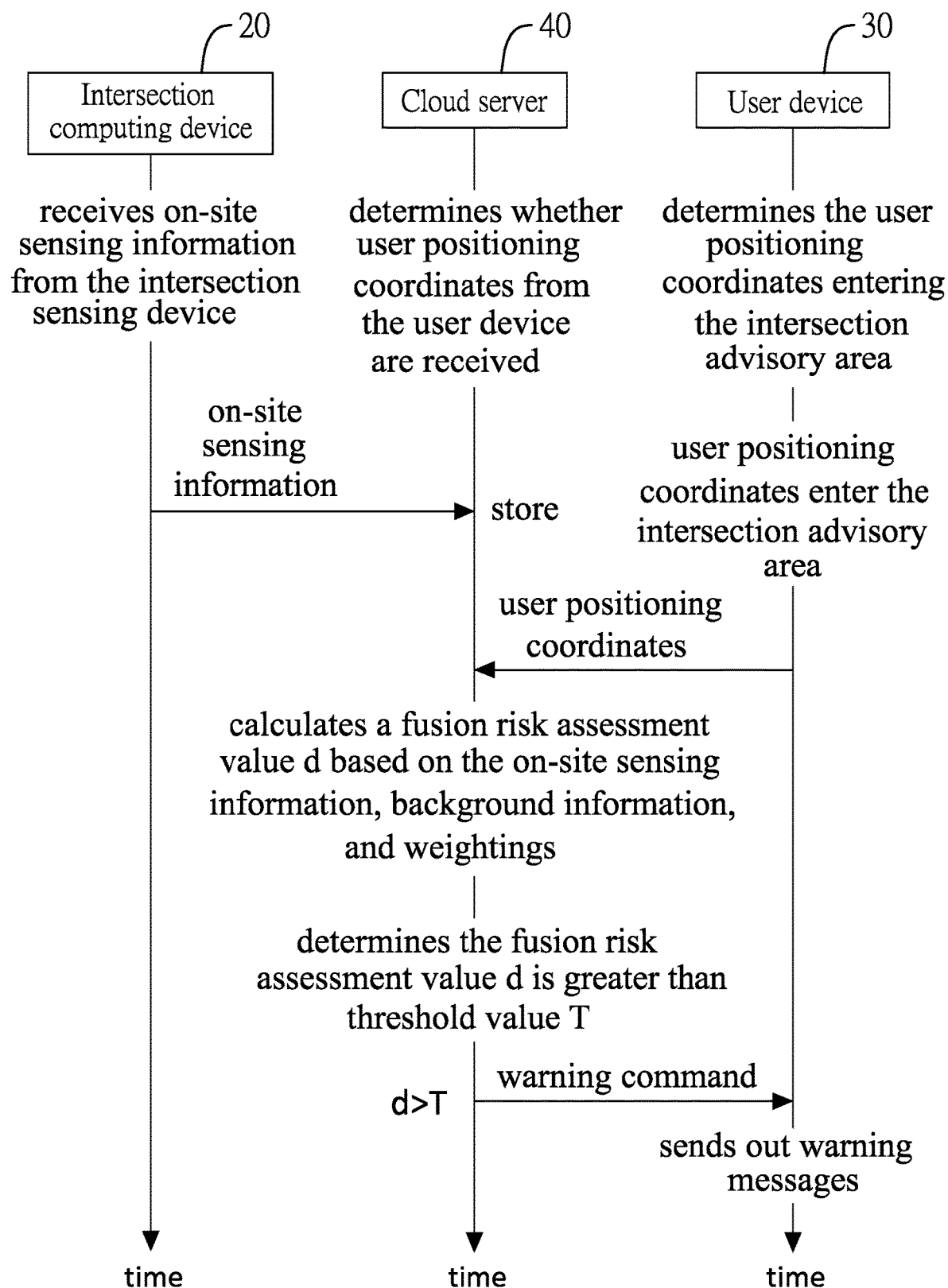
FIG. 4 is a process flowchart of the intersection warning method based on information fusion of the present invention.

Please refer to the flowchart of the intersection warning method based on information fusion of the present invention shown in FIG. 4. The warning method is carried out in the cloud server 40. Regarding the cloud server 40, the cloud server 40 keeps receiving and storing the on-site sensing information M sent from the intersection computing device 20, and determines whether the user positioning coordinates P are received from the user device 30. Wherein, the user device 30 moves along with the user, hence, the user positioning coordinates P also change dynamically. The user device 30 determines whether the user positioning coordinates P enter the intersection advisory area 70, and after the user device 30 determines that the user positioning coordinates P enter the intersection advisory area 70, the user device 30 sends the user positioning coordinates P to the cloud server 40.

When the cloud server 40 receives the user positioning coordinates P, at this moment, the cloud server 40 reads a system time which is the time of the operating system of the cloud server 40 itself. In addition, the cloud server 40 further reads the on-site sensing information M and the at least one background information BG corresponding to the intersection advisory area 70, and then determines the evaluation parameter. Wherein, the time of the at least one background information BG read by the cloud server 40 corresponds to the system time. For example, please refer to "traffic information during a period" in the table above, when the cloud server 40 determines the system time is within the time period corresponding to the code "B1", the cloud server 40 determines the evaluation parameter to be 0.3 based on the code "B1".

That is to say, when the cloud server 40 receives the user positioning coordinates P, it means the user enters the intersection advisory area 70; at this moment, the data obtained by the cloud server 40 includes (1) the system time, (2) the at least one background information BG and evaluation parameter thereof corresponding to the intersection advisory area 70, and (3) the on-site sensing information M corresponding to the intersection advisory area 70. Wherein, the cloud server 40 determines evaluation parameters corresponding to the on-site sensing information M. For example, the cloud server 40 can recognize an obstacle quantification value according to the shots taken by the camera 11, scan information from Radar 12 or scan information from LiDAR 13. As shown in the following table, the cloud server 40 can determine the evaluation parameters according to the obstacle quantification value.

| Obstacle Quantification Value | Evaluation Parameters |
|---|---|
| Less Than or Equal to a Threshold Value | 0.2 |
| Greater Than the Threshold Value | 0.8 |

In the above table, the threshold value is adjustably preset. It should be noted that when a user wants to pass the intersection 50, the pedestrians, the bikes, the vehicles, the animals, etc. at the intersection 50 are obstacles for the user, hence, when the on-site sensing information M is the shot taken by the camera 11, the cloud server 40 can recognize the at least one object from those pedestrians, bikes, vehicles and animals, and determine the total proportion of the at least one object in the shot as the obstacle quantification value. Or when the on-site sensing information M is the scan information from the Radar 12 or the LiDAR 13, the cloud server 40 can recognize the at least one object from those pedestrians, bikes, vehicles and animals, and determine the total area or the total volume of the at least one object as the obstacle quantification value. It is to be noted that to recognize the at least one object and to determine its total proportion in the shot, as well as to recognize the at least one object and to determine its total area or total volume from the scan information are common knowledge of the related technical field.

Figure 5:
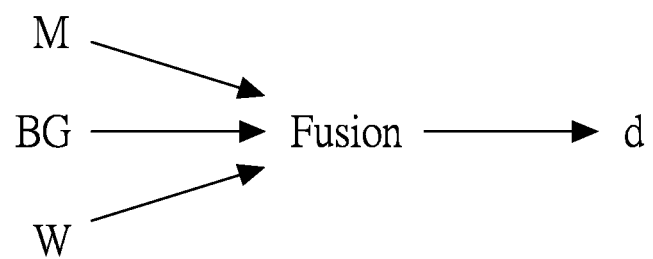
FIG. 5 is a schematic of fusion calculation of the fusion risk assessment value in the present invention, based on on-site sensing information, background information and weightings.

Please refer to FIG. 5. The cloud server 40 calculates a fusion risk assessment value d based on the on-site sensing information M, the at least one background information BG and multiple weightings W, wherein, the multiple weightings W are adjustably preset to be real numbers greater than or equal to zero and smaller than or equal to one. Within the on-site sensing information M and the at least one background information BG, those having greater influence on safety have larger weightings, and vice versa. For example, the weighting corresponding to the weather information is 0.3, and the weighting corresponding to the historical traffic flow is 0.2. That means the weather information has greater influence on driving risk than the historical traffic flow. Hence, the multiple weightings respectively correspond to the on-site sensing information M and the at least one background information BG. On the whole, the fusion risk assessment value d reflects the risk of a traffic accident when the user passes through the intersection 50. The higher the fusion risk assessment value d, the greater the risk of a traffic accident, and vice versa.

The cloud server 40 determines the multiple evaluation parameters respectively corresponding to the on-site sensing information M and the at least one background information BG, and then, calculates the fusion risk assessment value d based on the multiple evaluation parameters and multiple weightings W. In one embodiment of the present invention, the fusion risk assessment value d is expressed as follows:

$$d=\Sigma_{k=0}^{n} S_k W_k$$

In the above formula, d is the fusion risk assessment value; $S_k$ is evaluation parameters each respectively corresponding to the on-site sensing information M and the at least one background information BG; $W_k$ is weightings each respectively corresponding to the on-site sensing information M and the at least one background information BG; n is the quantity of the multiple evaluation parameters.

$$d=\Sigma_{k=0}^{2} S_k W_k = S_0 W_0 + S_1 W_1 + S_2 W_2$$

In the above formula, $S_0$ is the evaluation parameter corresponding to the on-site sensing information M; $S_1$ is the evaluation parameter corresponding to the weather information; $S_2$ is the evaluation parameter corresponding to the intersection accident rate; $W_0$ is the weighting corresponding to the on-site sensing information M; $W_1$ is the weighting corresponding to the weather information; $W_2$ is the weighting corresponding to the intersection accident rate.

The cloud server 40 stores a threshold value T corresponding to the intersection advisory area 70, wherein, the threshold value T is a real number greater than or equal to 0 and less than or equal to 1. As mentioned earlier, the actual road conditions include the road conditions of multiple intersections. Since the road condition differs from one intersection to another, the threshold value T can be adaptively adjusted according to road condition of an intersection 50. For example, since the road conditions of intersections in a city are usually very busy, the threshold value T of the intersections in a city is set to be less than that of the intersections in suburban areas.

Figures 6, 7:
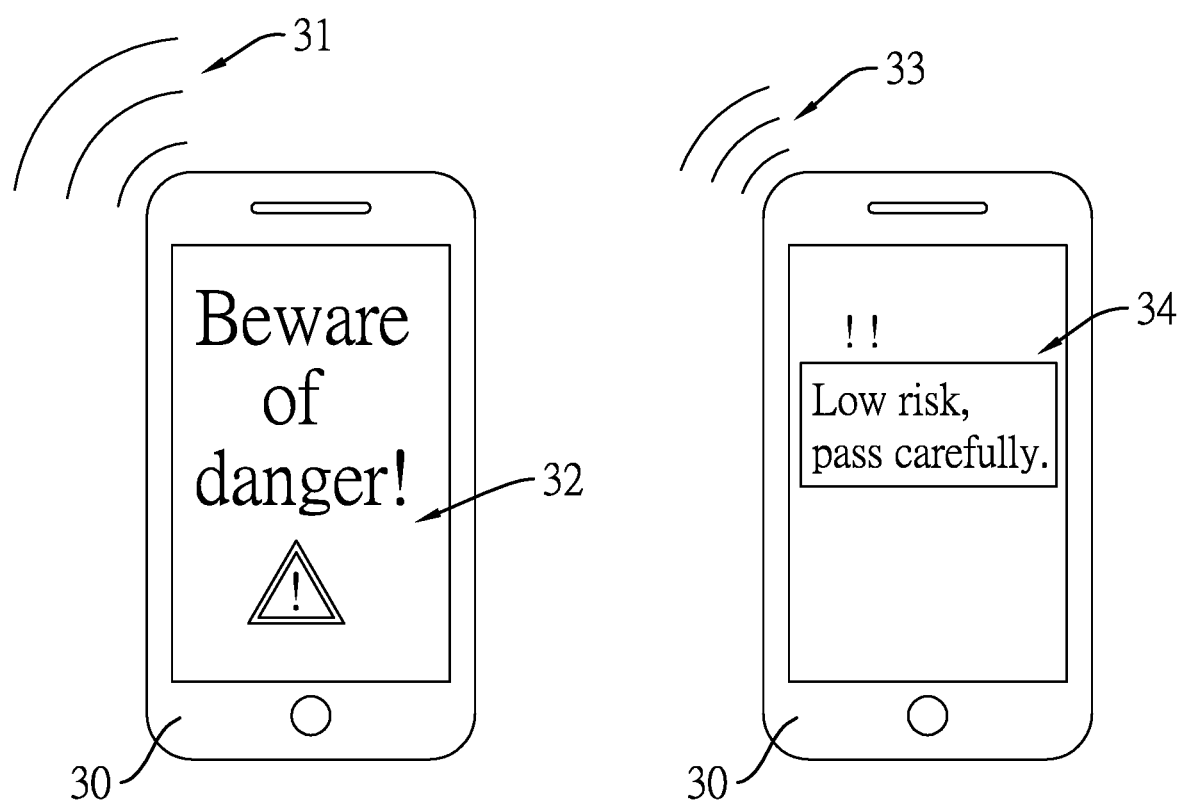
FIG. 6 is a schematic of sending out warning messages by a user device in the present invention.
FIG. 7 is a schematic of sending out reminding messages by a user device in the present invention.

After the cloud server 40 calculates the fusion risk assessment value d, the cloud server 40 determines whether the fusion risk assessment value d is greater than the threshold value T, i.e. to determine whether d>T. When the cloud server 40 determines d>T, it means that there is higher risk of accident for the user to pass the intersection 50. The cloud server 40 outputs a warning command S1 to the user device 30. After the user device 30 receives the warning command S1, warning messages are sent out according to the warning command S1. Please refer to FIG. 6. The warning messages can be warning tones 31 and/or warning screens 32. In contrast, when the cloud server 40 determines that d is not larger than T, i.e. d≤T, it means that the risk of accident for the user to pass the intersection 50 is low. The cloud server 40 outputs a reminding command S2 to the user device 30. After the user device 30 receives the reminding command S2, referring to FIG. 7, reminding messages are sent out according to the reminding command S2. The reminding messages can be reminding tones 33 and/or reminding screens 34. Wherein, the warning messages are conveyed in a stronger way than the reminding messages. For example, the warning tones 31 should be louder than the reminding tones 33, and the texts or colors of the warning screens 32 should be more eye-catching than the reminding screens 34.

In sum, the present invention combines the collected on-site sensing information M and the at least one background information BG with the weightings W to perform fusion calculations to generate the fusion risk assessment value d. The fusion risk assessment value d is used to assess the risk of an accident when the road user passes the intersection 50. When the risk is high, the user device 30 can send out warning messages to remind the road user to carefully pass the intersection 50. On the other hand, with the development of public construction, existing road intersections have been configured with roadside unit (RSU) devices, intersection surveillance cameras and other sensors. The intersection computing device 20 of the present invention can use the already configured RSU devices. The intersection sensing device 10 of the present invention can use the already configured intersection monitoring cameras and other sensors. The user device 30 of the present invention can also be a road user's smart phone, tablet computer or vehicle multimedia host. It can be seen that the implementation of the present invention can use equipment already configured, combined with the integrated application of the cloud server 40 and software technology, to break through the limitations of equipment, so that vehicles, motorcycles and pedestrians can benefit from the present invention, thereby protecting road users' safety and promoting overall traffic safety and efficiency.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An intersection warning system based on information fusion, including:
   an intersection sensing device, set up at an intersection;
   an intersection computing device, set up at the intersection and signally connected with the intersection sensing device, and outputting an on-site sensing information;
   a user device, providing user positioning coordinates and storing coordinate information of an intersection advisory area corresponding to the intersection; and
   a cloud server, signally connected to the intersection computing device and the user device, and storing at least one background information corresponding to the intersection;
   wherein when the user device determines the user positioning coordinates entering the intersection advisory area, the user positioning coordinates are sent to the cloud server; when the cloud server receives the user positioning coordinates, the cloud server reads the on-site sensing information and the at least one background information and calculates a fusion risk assessment value based on the on-site sensing information, the at least one background information and multiple weightings; when the cloud server determines the fusion risk assessment value is greater than a threshold value, a warning command is sent to the user device, and the user device sends out warning messages based on the warning command.

2. The intersection warning system based on information fusion as claimed in claim 1, wherein the cloud server determines multiple evaluation parameters respectively corresponding to the on-site sensing information and the at least one background information, and the fusion risk assessment value is expressed by a formula as follows:

$$d = \Sigma_{k=0}^{n} S_k W_k$$

where, d is the fusion risk assessment value, and $S_k$ is the evaluation parameters respectively corresponding to the on-site sensing information and the at least one background information, and $W_k$ is the weightings respectively corresponding to the on-site sensing information and the at least one background information, and n is the quantity of the multiple evaluation parameters.

3. The intersection warning system based on information fusion as claimed in claim 2, wherein the at least one background information is at least one of a weather information, a traffic information during a period, a real-time traffic information, an intersection accident rate, and a historical traffic flow.

4. The intersection warning system based on information fusion as claimed in claim 3, wherein each of the weather information, the traffic information during a period, the real-time traffic information, the intersection accident rate, and the historical traffic flow is respectively, a code or a combination of a code and a time period; and the cloud server determines the evaluation parameters according to the codes or combinations of the codes and the time periods.

5. The intersection warning system based on information fusion as claimed in claim 3, wherein the intersection sensing device is a camera, a Radar or a LiDAR, and the on-site sensing information is shots taken by the camera, scan information from the Radar, or scan information from the LiDAR; and the cloud server recognizes an obstacle quantification value based on the shots taken by the camera, the scan information from the Radar, or the scan information from the LiDAR, and the cloud server determines the evaluation parameters according to the obstacle quantification value.

6. The intersection warning system based on information fusion as claimed in claim 4, wherein the intersection sensing device is a camera, a Radar or a LiDAR, and the on-site sensing information is shots taken by the camera, scan information from the Radar, or scan information from the LiDAR; and the cloud server recognizes an obstacle quantification value based on the shots taken by the camera, the scan information from the Radar, or the scan information from the LiDAR, and the cloud server determines the evaluation parameters according to the obstacle quantification value.

7. The intersection warning system based on information fusion as claimed in claim 1, wherein data packets sent from the intersection computing device to the cloud server include identification codes and the positioning coordinates of the intersection computing device.

8. An intersection warning method based on information fusion, executed on a cloud server, including:
   receiving and storing on-site sensing information from an intersection computing device;
   determining whether user positioning coordinates from a user device are received;
   if the user positioning coordinates from the user device are received, reading the on-site sensing information and at least one background information, and calculating a fusion risk assessment value based on the on-site sensing information and the at least one background information; and
   determining whether the fusion risk assessment value is greater than a threshold value;
   if the fusion risk assessment value is greater than the threshold value, outputting a warning command to the user device which sends out warning messages according to the warning command.

9. The intersection warning method based on information fusion as claimed in claim 8, wherein, the cloud server determines multiple evaluation parameters respectively corresponding to the on-site sensing information and the at least one background information, and the fusion risk assessment value is expressed by a formula as follows:

$$d = \Sigma_{k=0}^{n} S_k W_k$$

where, d is the fusion risk assessment value, and $S_k$ is the evaluation parameters respectively corresponding to the on-site sensing information and the at least one background information, and $W_k$ is the weightings respectively corresponding to the on-site sensing information and the at least one background information, and n is the quantity of the multiple evaluation parameters.

10. The intersection warning method based on information fusion as claimed in claim 9, wherein, the at least one background information is a code or a combination of a code and a time period of the at least one of a weather information, a traffic information during a period, a real-time traffic information, an intersection accident rate, and a historical traffic flow; and the cloud server determines the evaluation parameters according to the codes or combinations of the codes and the time periods.

11. The intersection warning method based on information fusion as claimed in claim 9, wherein the cloud server recognizes an obstacle quantification value based on the on-site sensing information, and the cloud server determines the evaluation parameters according to the obstacle quantification value.

12. The intersection warning method based on information fusion as claimed in claim 10, wherein the cloud server recognizes an obstacle quantification value based on the on-site sensing information, and the cloud server determines the evaluation parameters according to the obstacle quantification value.

* * * * *